Figure 3:
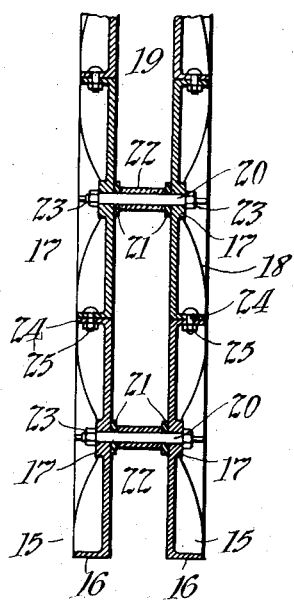

T. A. EDISON.
PROCESS OF CONSTRUCTING CONCRETE BUILDINGS.
APPLICATION FILED AUG. 13, 1908.
1,219,272.
Patented Mar. 13, 1917.
4 SHEETS—SHEET 1.
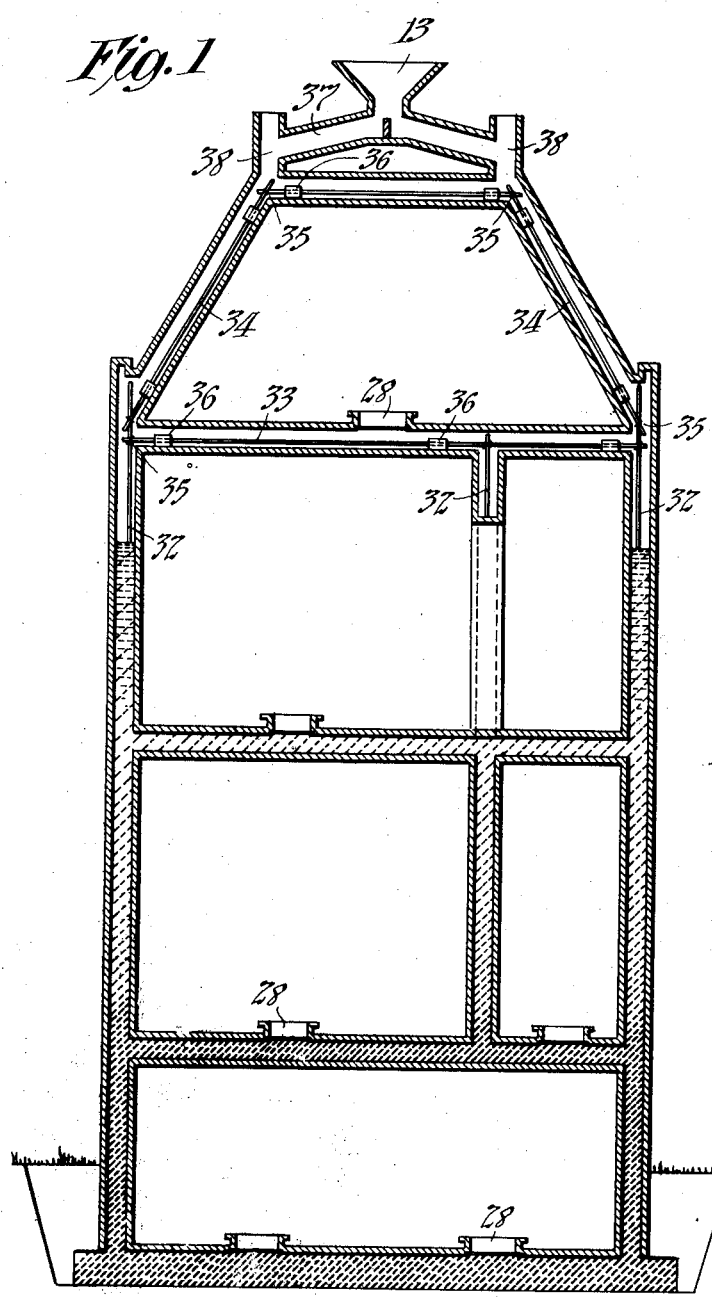
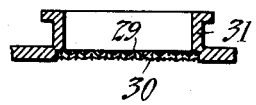
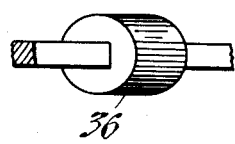
Witnesses:
Inventor:
Thomas A. Edison
by Frank L. Dyer
Atty.

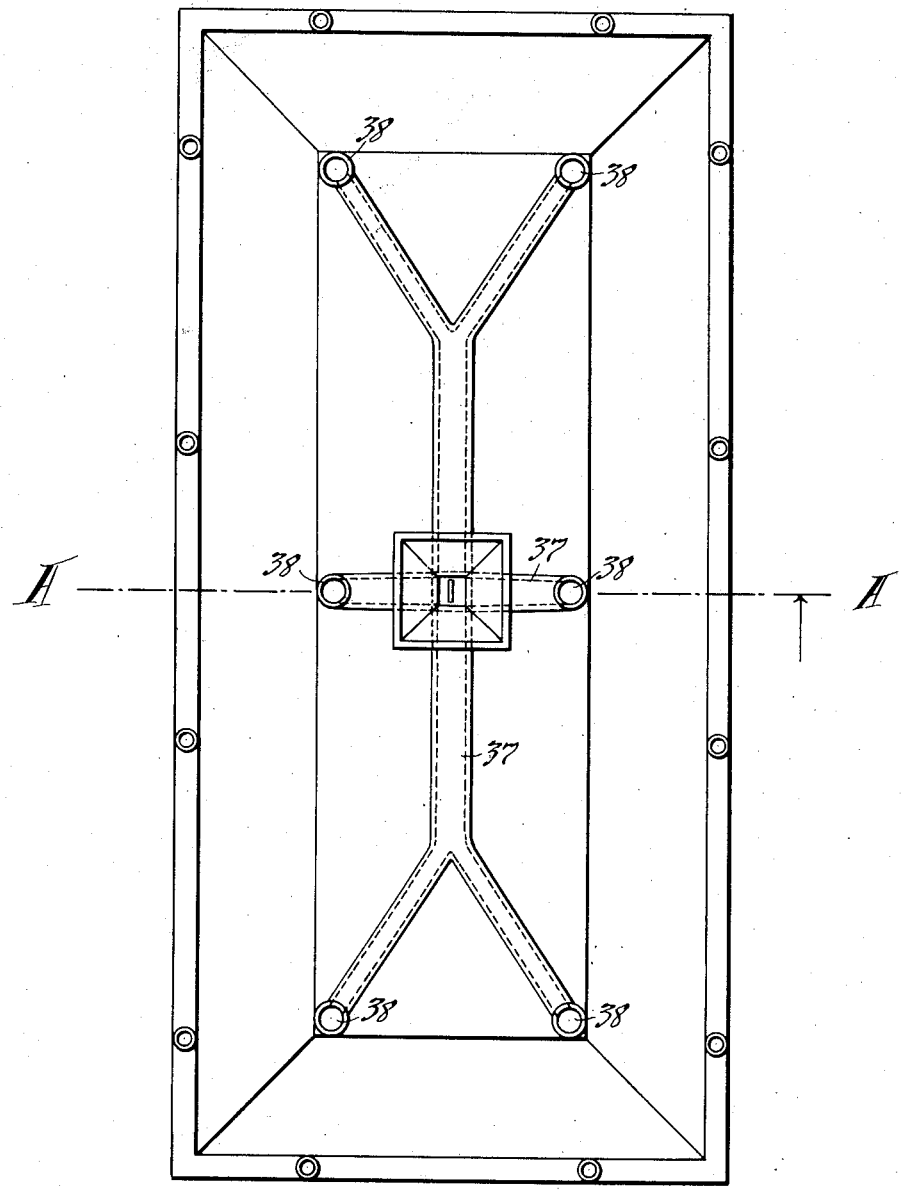

T. A. EDISON.
PROCESS OF CONSTRUCTING CONCRETE BUILDINGS.
APPLICATION FILED AUG. 13, 1908.

1,219,272.

Patented Mar. 13, 1917.
4 SHEETS—SHEET 3.

Witnesses:
Frank D Lewis
Dyer Smith

Inventor:
Thomas A. Edison
by Frank L. Dyer
Atty.

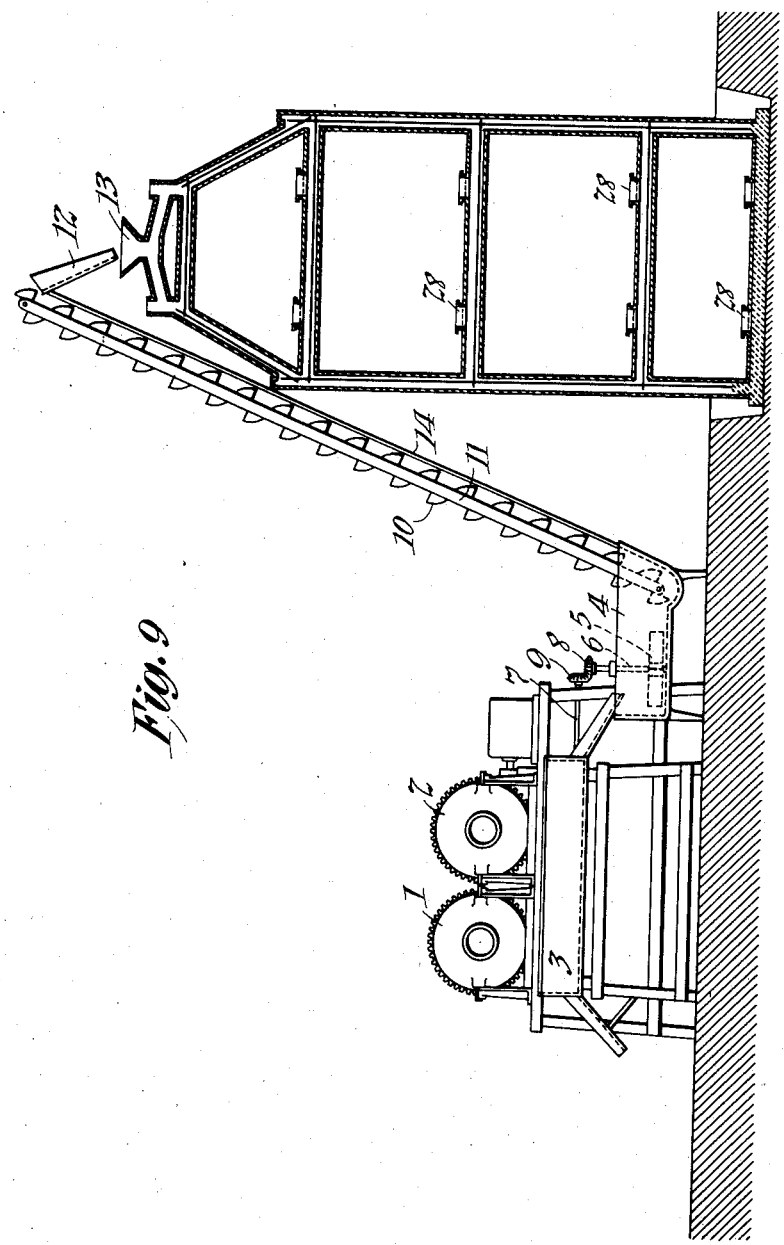

UNITED STATES PATENT OFFICE.

THOMAS A. EDISON, OF LLEWELLYN PARK, ORANGE, NEW JERSEY.

PROCESS OF CONSTRUCTING CONCRETE BUILDINGS.

1,219,272.  Specification of Letters Patent.  Patented Mar. 13, 1917.

Application filed August 13, 1908. Serial No. 448,293.

*To all whom it may concern:*

Be it known that I, THOMAS ALVA EDISON, a citizen of the United States, residing in Llewellyn Park, Orange, county of Essex, in the State of New Jersey, have invented certain new and useful Improvements in Processes of Constructing Concrete Buildings, of which the following is a description.

The object of my invention is to construct a building of a cement mixture by a single molding operation—all its parts, including the sides, roofs, partitions, bath tubs, floors, etc., being formed of an integral mass of a cement mixture. This invention is applicable to buildings of any sort, but I contemplate its use particularly for the construction of dwellings, in which the stairs, mantels, ornamental ceilings and other interior decorations and fixtures may all be formed in the same molding operation and integral with the house itself. The house thus made is practically indestructible and is perfectly sanitary. The cost of its construction is low and it is feasible to beautify such a house far beyond anything now possible in so cheap a manner.

In carrying out my invention I first construct a complete double wall house, which forms a mold for the reception of the cement mixture. This mold is preferably constructed of cast iron sections removably connected together in any suitable manner, as by means of bolts, dowels, etc., and adapted when the house is constructed and the cement mixture is hardened, to be taken to pieces and removed and used repeatedly for the construction of an indefinite number of houses. When the mold has been constructed and erected I connect a number of distributing pipes therewith, which are preferably arranged at regular intervals at the top of the mold, the said pipes being connected to a common source of supply, which may conveniently consist of a vertical riser having a funnel-shaped opening for the reception of the cement mixture.

A Portland cement mixture especially adapted for this work is prepared adjacent to the mold and is raised continuously to the top of the mold and poured into the riser thereon, whence it flows around the top of the mold and is distributed evenly throughout the structure. An important feature of my invention consists in so regulating the rate of pouring the cement into the mold, taken in connection with the hard-setting time of the cement mixture, that the lower sections of the cement in the mold will have hardened before the level of the liquid cement above has risen very greatly, so that only a short column of the cement will act to create hydraulic pressure upon the mold. Because of this method, a much lighter and cheaper form of mold may be employed than would otherwise be necessary. It is also very desirable that the flow of cement into the molds should not be intermittent, as an intermittent pouring tends to produce seams. It is also desirable to have the mixture poured in as short a time as possible to save expense, but if the mixture is poured too rapidly, as above set forth, the molds need to be heavy to withstand the hydraulic pressure of the liquid cement. The best process of molding is therefore determined by a consideration of the hardening time of the cement, which should be quick, the rate of pouring this cement mixture and the strength of the mold used, the pouring being at such a rate as compared with the hard setting time of the cement that only a short column of cement will act to create hydraulic pressure upon the molds, and this will not be too great for the strength of the molds used.

My copending application Serial No. 143,017, filed January 18, 1917, and entitled Concrete structures, is a division hereof and contains claims covering my improved concrete building; and my copending application Serial No. 143,018, filed January 18, 1917, and entitled Apparatus for the production of concrete structures, is also a division hereof and contains claims covering my improved apparatus for constructing such buildings.

Figure 4:
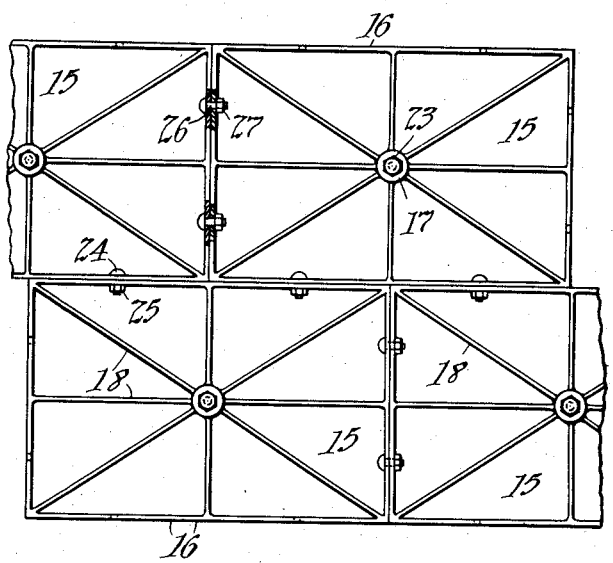
Figure 5:
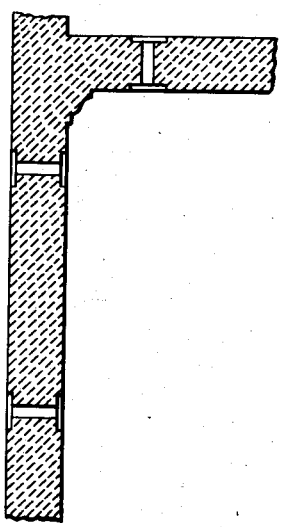
Figure 6:
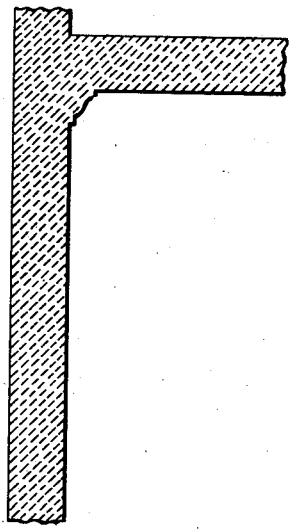

In order that the invention may be better understood, attention is directed to the accompanying drawings, forming part of this specification, and in which Figure 1 represents a vertical cross section on line A—A of Fig. 2, and shows an erected mold, all the movable sections connected together, in which the pouring of the cement mixture has progressed up to a point about midway of the second story of the house, the cement at the bottom having hardened and being liquid at the top. Fig. 2 represents a plan view of the mold, showing the vertical riser and the distributing troughs. Fig. 3 is a vertical cross section and Fig. 4 is a side elevation through several of the mold sections, showing the preferred method of spacing and connecting the same. Figs. 5 and 6 are details showing the appearance of the walls of the house after the molds and bolts have been removed in Fig. 5, and in Fig. 6 after the bolt holes have been filled. Fig. 7 is a detail showing an air vent provided at various points in the mold to guard against the trapping of air while preventing the escape of the cement. Fig. 8 is a detail showing a reinforcing rod with cement supporting sleeve. Fig. 9 is a side elevation partly in section showing the method of mixing cement and elevating the same to the top of the mold and pouring the same therein. The same reference characters are used throughout the various figures to refer to corresponding parts.

I have preferably used for the molding operation a cement mixture formed of crushed stone, quartz or similar materials having particles varying from $\frac{1}{4}$ to $\frac{1}{2}$ inch in diameter, say five parts; ordinary sand, say three parts; and Portland cement, say one part; although these proportions may be considerably varied. Enough water is used to form an emulsion having sufficient fluidity to flow readily to all parts of the mold. During the setting of the mixture the water enters into chemical combination in the usual way, and if any surplus water is present it will appear as a mere dampness, which quickly dries out. In order to prevent settling of the crushed material during the molding operation and before setting commences and the resulting objectionable segregation of the ingredients I find that by adding a comparatively small amount of fine clay to the mixture, say twenty per cent. of the cement used, the tendency to settling is greatly diminished, while at the same time the amount of water used is sufficient to give a high degree of fluidity to the emulsion and permit very successful molding.

As shown in Fig. 9, the cement is mixed in mixers 1 and 2. The mixture is poured out of either mixer into tank 3, where it is tested. If it is found to be a correct mixture it is allowed to flow into agitator tank 4; otherwise it is poured on the ground; agitator 5 is constantly rotated by means of shafts 6 and 7, carrying intermeshing gears 8 and 9, shaft 7 being rotated from a source of power not shown. The well mixed cement in tank 4 is elevated by means of buckets 10 of the endless bucket conveyer 11 to the top of the mold, where it is poured through funnel 12 into the vertical riser 13 to the mold. The conveyer is guarded by a shield, 14.

Referring particularly to Figs. 1, 3 and 4, the molds are preferably made of sections in the form of castings, as 15, 15, having flanges 16, 16. These castings are formed with bosses 17, 17, from, which radiate ribs 18. The molds are held together and spaced apart such a distance as to form a wall of the requisite thickness in the space 19 between them by means of bolts 20, carrying wooden washers 21 on the inside of the mold walls and cement sleeves 22 between the washers. The bolts may be drawn up tightly and secured by nuts 23 on the inside of the bosses. The molds are held together by means of the bolts 24 extending through the horizontal flanges carrying nuts 25 and by bolts 26 through the vertical flanges, bolts 26 carrying nuts 27. The molds are preferably arranged in staggered relation, as shown in Fig. 4. To guard against the trapping of air and consequent imperfection of the molded cement when finished, I provide at various points in the mold where air is liable to trap, as for example, in the floors and partitions and wherever cement has to flow through tortuous channels, a number of air vents 28 which will allow the escape of the air but will prevent the escape of the cement. One way in which I may construct such air vents is illustrated in Fig. 7, and consists in making flanged openings in the mold sections, which are closed by an outer screen, preferably of coarse wire mesh, 29, and by an inner lining of filter cloth, 30. These vents, as shown, are formed with flanges 31.

While a house of this character may be made of cement mixtures alone, a much better and stronger house may be made if the structure is reinforced with properly formed metal reinforcing rods. Such rods if used may be secured to the molds in any way that will offer proper support to the rods during the molding process and will not prevent the removal of the mold sections after the house is completed. In the drawings reinforcing rods 32, 33 and 34 are shown fastened together at the points where they cross each other by wires, 35, wrapped a few times around them. These rods carry sleeves, 36, formed of the cement mixture used in the construction of the house which support the rods against the contiguous surface of the molds. The house is shown in the drawing as having a cellar, two stories and a roof. The cement mixture poured continuously into vertical riser 13, flows therefrom through troughs or pipes, 37—38, whence it is distributed evenly through the various parts of the mold, thus preventing segregation of the components of the mixture. The pouring is continued until the whole mold, forming the complete house, is filled to the highest point and the cement has risen part way up into riser 13. The pouring operation is conducted continuously, and preferably very rapidly, so that in, for example, a house forty feet high the whole of the cement should be poured in three or four hours. In such a case if the cement contents of the vertical sections of the mold remained entirely liquid during the entire period of pouring the same, the iron molds would be subjected to hydraulic pressure of several thousand pounds per square foot, which would require that the mold sections would have to be made very heavy to stand the pressure and not to be distorted thereby. By my method of pouring, however, by using a rapidly hardening cement, ground very fine, the bottom of the column of cement formed between the vertical molds for, say, two or three feet, is hardened sufficiently to prevent it from flowing or exerting hydraulic pressure on the adjacent mold when the column of cement has risen to the first story, or, say, ten feet. In the example given, the molds, of course, would have to be made of greater strength than that necessary to withstand the pressure of a column of liquid cement seven or eight feet high.

After the cement has stood for a sufficient length of time for perfect hardening, the mold sections are removed by unscrewing the various nuts, 23, 25 and 27, etc., and removing the bolts and also washers, 21. Cement sleeves 22, which serve to space the molds apart the proper distance, having become merged in the integral structure of the wall, the holes left by the removal of the bolts, 20, and washers, 21, are filled by the insertion of a sufficient quantity of cement mixture. The house or structure thus formed in one operation may be of any convenient ornamental design, and may be tinted or colored in the most artistic manner.

Having now described my invention, what I claim as new therein and desire to secure by Letters Patent is as follows:

1. The process of constructing a cement structure, which consists in setting up a mold for the structure and pouring fluid cement mixture into the mold at such a rate as compared with the hard-setting time of the cement mixture that only a short column thereof will act to create hydraulic pressure upon the mold, substantially as set forth.

2. The process of constructing a cement structure, which consists in pouring a rapidly hardening cement mixture into the mold for the walls of the structure at such a rate that the cement will have hardened at the bottom of the mold before the level of the liquid reaches the top of the mold, substantially as set forth.

3. The process of constructing a house, which consists in erecting a complete double-wall house formed of removably connected sections including wall, floor and roof portions, pouring a homogeneous cement mixture into the mold thus formed continuously until it has completely filled all portions of the mold, allowing the cement to harden, and removing the sections, substantially as set forth.

4. The process of constructing a house, which consists in erecting a complete double-wall house formed of removably connected sections including wall and floor portions, providing a supply of fluid cement mixture uniform in composition and of such a character as to flow readily and without segregation of ingredients, pouring the same continuously into the mold, causing all portions of the latter to be filled with the mixture, allowing the same to harden, and removing the sections, substantially as set forth.

5. The process of constructing a building, which consists in setting up sectionally a mold for a complete six-sided apartment, pouring cement mixture continuously into the mold to fill the same, and removing the sections of the mold after the mixture has hardened, the sections from the interior being removed through an opening or openings in the completed structure, substantially as described.

6. The process of constructing a building, which consists in setting up sectionally a mold for a complete structure comprising a plurality of six-sided apartments, one above the other, pouring cement mixture continuously into the mold to fill the same, and removing the sections of the mold after the mixture has hardened, the sections from the interior being removed through an opening or openings in the completed structure, substantially as described.

7. The process of constructing a house which consists in erecting a complete double-wall mold formed of removably connected sections including wall and floor portions, pouring a cement mixture into the mold continuously until it has completely filled all portions of the mold and at such a rate that the mixture will harden at the bottom of the mold before the level of the mixture reaches the top of the mold, allowing the cement to harden, and removing the sections, substantially as described.

This specification signed and witnessed this 10th day of August, 1908.

THOS. A. EDISON.

Witnesses:
FRANK L. DYER,
FRANK D. LEWIS.